(12) United States Patent
Berthelemy

(10) Patent No.: US 10,087,996 B2
(45) Date of Patent: Oct. 2, 2018

(54) MAGNETORHEOLOGICAL ACTUATOR HAVING A ROTATIONALLY DRIVEN THREADED SPINDLE AND CLUTCH HAVING AN ACTUATOR

(71) Applicant: Schaeffler Technologies AG & Co. KG, Herzogenaurach (DE)

(72) Inventor: Pierre-Yves Berthelemy, Souffelweyersheim (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 118 days.

(21) Appl. No.: 15/114,353

(22) PCT Filed: Jan. 22, 2015

(86) PCT No.: PCT/DE2015/200016
§ 371 (c)(1),
(2) Date: Jul. 26, 2016

(87) PCT Pub. No.: WO2015/113564
PCT Pub. Date: Aug. 6, 2015

(65) Prior Publication Data
US 2017/0089408 A1    Mar. 30, 2017

(30) Foreign Application Priority Data
Feb. 3, 2014    (DE) .................. 10 2014 201 835

(51) Int. Cl.
*F16D 29/00*    (2006.01)
*F16D 27/115*    (2006.01)
(Continued)

(52) U.S. Cl.
CPC ............ *F16D 29/00* (2013.01); *F16D 27/115* (2013.01); *H02K 1/22* (2013.01); *H02K 5/02* (2013.01);
(Continued)

(58) Field of Classification Search
None
See application file for complete search history.

(56) References Cited

U.S. PATENT DOCUMENTS 2,824,460 A    2/1958   Davis et al.
6,755,290 B1   6/2004   Dolan et al.
(Continued)

FOREIGN PATENT DOCUMENTS

EP    1 438 517 B1    7/2004
EP    2 060 800 B1    5/2009
WO   WO 00/53936 A1   9/2000

*Primary Examiner* — Jacob S Scott
(74) *Attorney, Agent, or Firm* — Davidson, Davidson & Kappel, LLC

(57) ABSTRACT

A magnetorheological actuator including a chamber, in particular a chamber at least sections of which are shaped like a hollow cylinder, containing a magnetorheological fluid, and further including a control element disposed in the chamber, wherein the control element suitable for applying the operating force of the actuator, wherein the control element is a threaded spindle or screw or threaded rod driven to rotate about its longitudinal axis, in particular about the screw axis, and including a spindle core and a thread disposed thereon, the thread surrounded by the magnetorheological fluid, is provided. A clutch having such an actuator is also provided.

16 Claims, 15 Drawing Sheets

(51) Int. Cl.
    *H02K 5/02*         (2006.01)
    *H02K 1/22*         (2006.01)
    *H02K 7/11*         (2006.01)
    *H02K 7/08*         (2006.01)
    *H02K 99/00*       (2014.01)
    *F16D 121/18*      (2012.01)

(52) U.S. Cl.
    CPC ............... *H02K 7/08* (2013.01); *H02K 7/11* (2013.01); *H02K 99/20* (2016.11); *F16D 2121/18* (2013.01)

(56) References Cited

U.S. PATENT DOCUMENTS

2003/0155201 A1\*   8/2003   Bowen ................. F16D 27/115
                                                           192/35
2015/0184497 A1\*   7/2015   Whitby ................ F15B 15/261
                                                           166/75.11

\* cited by examiner

MAGNETORHEOLOGICAL ACTUATOR HAVING A ROTATIONALLY DRIVEN THREADED SPINDLE AND CLUTCH HAVING AN ACTUATOR

The invention relates to a magnetorheological actuator comprising a chamber, in particular a chamber at least sections of which are shaped essentially like a hollow cylinder, which contains a magnetorheological fluid, and further comprising a control element disposed in the chamber, the control element disposed to apply an operating force of the actuator.

BACKGROUND

Such actuators are used, for instance, in the field of motor vehicle technology for operating clutches in manual or automatic transmissions, dampers, or brakes etc. In manual transmissions, the actuator usually consists of a hydraulic system that is directly operated by the driver. A hydraulic section of a specific transmission ratio transmits the operating energy from a pedal that has been operated by the driver to a disengagement element of the clutch. In automatic transmissions or hybrid drive trains, there are a number of different operating devices or actuators that are implemented in the form of combinations of hydraulic, mechanical, or electrical systems.

A known use for magnetorheological fluids (also abbreviated to MRF in the following text) is in dampers, brakes, and clutches. A magnetorheological fluid (MRF) is a suspension of magnetically polarizable particles (such as carbonyl iron powder) that are finely distributed in a carrier fluid. In such known applications, the MRF is used as a direct clutch/damping/braking fluid. Main disadvantages of the indicated systems when they are integrated in compact clutches are size, complexity, and/or costs. In particular in fast-rotating applications, a disadvantage of known MRF clutches is that a complete separation as it is possible in conventional clutches of the strands that are connected by the clutch is impossible because there will always be residual friction in the clutch due to the MRF, a fact which is detrimental to the degree of efficiency. Another disadvantage is that the centrifugal effect on the particles of the MRF may affect the torque behavior.

EP 1 438 517 B1 for instance discloses a controllable brake comprising a) a rotor embodied to have a working portion on its periphery which extends parallel to a shaft on which said rotor is mounted, b) a shaft on which said rotor is mounted in a manner to restrain a relative movement between the shaft and the rotor, c) a housing having a first chamber rotatably housing the rotor therein and including a magnetic field generator spaced apart and separate from the rotor and configured and positioned to generate magnetic flux through a magnetically controllable material in a direction perpendicular to the shaft and to the working portion of the rotor, wherein d) the magnetically controllable material contained within said first chamber is in contact with at least the working portion of the rotor, and wherein the brake is characterized by e) an active return-to-center device in the first chamber to cause the rotor to return to a relative center position EP 2 060 800B1 discloses a combined actuator comprising a mobile element, a drive for displacing the mobile element along a path, and a rheological control brake mechanically coupled to the movable element to adjust the displacement of the movable element along the path, wherein the combined actuator is characterized in that the rheological control brake comprises at least two contiguous readjustment chambers, a magnetorheological fluid contained in the two readjustment chambers, at least one sliding piston, which tightly separates the two adjustment chambers and is mechanically connected to the mobile element, at least one external connection pipe, which reciprocally connects the two adjustment chambers and is arranged outside the two adjustment chambers themselves, and a driving device which is coupled to the external connection pipe so as to apply a variable magnetic field to the rheological fluid contained in the exterior connection pipe for varying the viscosity of the rheological fluid between a minimum value, at which the rheological fluid may freely flow through the exterior connection pipe, and a maximum value, at which the rheological fluid cannot flow through the external connection pipe, wherein the driving device comprises a ferromagnetic core in the form of an open ring having an interruption defining a gap in which the exterior connection pipe is arranged, at least one winding which is coupled to the ferromagnetic core, and an electric generator connected to the winding to circulate an electric current of adjustable intensity in the winding.

WO 00/53936 A1 discloses a controllable pneumatic apparatus comprising a pneumatic system including a pneumatic actuator having a housing, a piston disposed in the housing and movable responsive to a pressure differential acting upon the piston, and at least one output member coupled to the piston, and a rotary-acting controllable brake including a field responsive medium contained therein, the rotary-acting controllable brake including a brake shaft coupled to the output member for controlling motion thereof.

SUMMARY OF THE INVENTION

It is an object of the present invention to provide a new actuating concept and an actuator that do not have the aforementioned disadvantages and are of the simplest possible compact construction.

In a clutch of this general type, the object is attained in accordance with the invention in that the control element is a threaded spindle or screw or threaded rod driven to rotate about its longitudinal axis, in particular about the screw axis, and having a spindle core and a thread disposed thereon, the thread surrounded by a magnetorheological fluid. The thread may advantageously have a constant outer diameter or nominal diameter. The chamber may at least in sections be shaped like a hollow cylinder. In other words, the actuator, in particular the control element thereof, may have a thread that is disposed to be axially displaceable on the drive shaft and is rotationally coupled to the drive shaft, and whose thread helixes engage in the magnetorheological fluid. The latter is contained in the actuator to be axially fixed in position relative to the drive shaft, in particular axially fixed in position relative to the drive shaft in the solidified state. Consequently, the invention may be used in a clutch of a normally closed type. Of course, its use is likewise conceivable in a normally open clutch.

In other words, the invention relates to an innovative operating system for clutches, brakes, or similar applications in which two units that are movable relative to one another need to be positioned relative to one another. The principle that has been presented may be used in different types of clutches, but it is particularly well-suited for friction clutches. The current development of hybrid drive trains or the electrification of auxiliary aggregates today increasingly requires the use of clutches, for instance pulley clutches, that may be controlled in a compact way. The actuator of the invention is particularly well-suited for such applications.

The actuator of the invention is based on the use of a magnetorheological fluid (MRF) operating/working in combination with a thread, in particular a threaded spindle. The MRF is used in an innovative way. In contrast to the known uses, it is not used directly as a working medium such as a clutch or brake fluid. Instead, it is used to effect a movement of a control element for the unit to be operated. The principle of an Archimedean screw is combined with the properties of an MRF under the influence of a magnetic field, which will be described in more detail below, to provide a conversion of a rotary movement of the control element, which is in operative connection with the thread, into an axial movement of the control element. Another aspect is that energy required to operate the unit actuated by the actuator, may be stored as kinetic energy in the actuator itself. An essential advantage of the actuator of the invention is that an MRF exhibits an essentially linear change of the shear stress as a function of an applied magnetic field for controlling the solidification of the MRF. This causes the actuator to be particularly good to control (potentially in a closed control loop).

For a better understanding, the behavior of an MRF will be described below. An MRF essentially consists of a carrier fluid such as oil in which magnetically polarizable particles of a size approximately between 1 μm and 5 μm are suspended. To stabilize the MRF with respect to sedimentation, i.e. a settling out of the particles, the MRF may contain specific chemical additives. Without the influence of a magnetic field, the MRF is liquid. Exposure of the MRF to an external magnetic field results in the formation of chains of particles adhering to one another due to interaction between magnetic dipoles of the particles. As a result, the MRF rigidifies within milliseconds and transitions to a solidified state. When the external magnetic field is removed, the particles no longer form magnetic dipoles and the MRF re-liquefies, i.e. returns to a liquid state.

In the solidified state, a MRF may be described as Bingham solids in accordance with the following equation:

$$\tau = \tau_0 + \eta \dot{\gamma}$$

In this equation, $\tau$ is the shear stress, $\tau_0$ the field-induced yield stress, $\eta$ the dynamic viscosity or basic viscosity, and $\dot{\gamma}$ the shear rate. A graphic representation of the relationship between the shear stress and the shear rate in relation to the magnetic field strength of an applied magnetic field is common. It shows that without a magnetic field, at a shear rate greater than zero, the MRF behaves like a Newtonian fluid. When a magnetic field of a field strength B is applied and the shear rate is zero, the MRF behaves like a solid as long as the applied shear stress is below the field-induced yield stress. When a magnetic field of a field strength B is applied and the shear rate is greater than zero, the MRF is viscous. This solidification of the MRF under the influence of a magnetic field is used for the sealing of the actuator of the invention.

The fundamental principle of the actuator is that the thread may rotate more or less freely in the MRF without any detrimental axial forces acting on the thread that interacts with the MRF as long as the latter is not exposed to a magnetic field and therefore in a liquid state. When the MRF is exposed to a magnetic field, it solidifies. In this case, the thread may no longer rotate without impediment in the solidified MRF. In other words, as the thread continues to rotate, the solidified MRF applies forces to the thread in a manner similar to a nut acting on the thread of a screw. Due to the geometry of the thread, these forces are converted into longitudinal or shear forces acting in an axial direction of the thread, allowing an axial offset or an axial displacement to occur if the thread is correspondingly disposed to be axially movable.

A special advantage of the invention is that in one embodiment, it may take what has been a disadvantageous property of an MRF, namely what is known as sedimentation, and use it to its advantage. When the MRF is exposed to a magnetic field, the MRF solidifies. The strength of an MRF in a solidified state basically depends on the yield stress and the shear area. When a shear stress applied to the MRF exceeds the yield stress, the chains formed by the polarized particles of the MRF will break. Due to the continuing effect of the magnetic field, however, the chains will immediately reform especially in areas of lower shear stress. The invention may make use of this circumstance to generate a virtually unlimited axial actuating force of the actuator. If there is a way for the MRF carrier liquid that has been conveyed behind the thread to return to a region in front of the thread, (in a way similar to a separation of particles and carrier fluid due to sedimentation), a cushion of MRF particle chains that are created by the continuing effect of the magnetic field may be built up behind the thread. On this cushion, the thread may apply high transmittable forces. The effect that is used in this instance will be explained in more detail below.

Advantageous embodiments of the invention are claimed in the dependent claims and will be explained in more detail below.

The threaded spindle may be received in the chamber to be axially displaceable. It may in particular be mounted in bearings. For this purpose, it is advantageous if the axial length of the thread is shorter than the axial length of the chamber.

The thread, in particular thread tips of the thread, may contact an interior wall of the chamber in a sealing manner. In this case, the MRF needs a way to return from one side of the thread to the other (as viewed in a longitudinal direction) in order for the thread to rotate therein without too much resistance when the MRF is in a liquid state.

In one embodiment, there is a clearance, gap, or depression for instance in the shape of a groove or bore between the thread tips, i.e. the outer edges, the outer or nominal diameter of the thread, and an interior wall of the chamber. The outer diameter or nominal diameter of the thread may in particular be smaller than the diameter of the interior wall of the chamber. Such a clearance allows the MRF that has been conveyed to one side of the thread by the thread helixes to flow back to the opposite side of the thread as a result of the high pressure that is built up on the first side. A continued rotation of the thread in the liquid MRF is thus possible without too much resistance. The clearance may in particular be dimensioned to allow the carrier liquid of the magnetorheological fluid to pass through the gap in particular when the magnetorheological fluid solidifies as a result of a magnetic field acting thereon. In a particularly advantageous way, the return of the MRF or MRF carrier fluid from one side of the thread to the other may be implemented by axial passages provided in the threaded spindle, in particular in the thread and/or the thread flanks to create a flow connection or shortcut between contiguous thread sections.

It is advantageous if the thread is a multi-start thread, in particular a two-, three-, or four-up to six-start thread. Compared to a single-start thread, the use of multi-start threads may increase the conveying rate of an MRF/of the polarizable or polarized particles of the MRF, providing an actuator with short and quick response times as desired for a fast/quick operation of clutches or brakes. An additional or alternative option to improve the conveying rate of the thread is to provide varying thread slopes, in particular a non-linear slope. In front sections, i.e. at the beginning of the conveying path, the thread may have a steep slope, resulting in a high conveying rate, whereas in a rear section, in particular at the end of the thread, the thread may have a gentler slope, resulting in a reliable support of the last thread section on a particle cushion located behind the thread. A further additional or alternative option to improve the conveying rate of the thread is to provide an interior diameter of the thread that is different from, in particular smaller than, the diameter of the spindle core in a region outside the thread.

It is particularly advantageous if the threaded spindle has spindle core sections of a cylindrical shape on both sides of the thread for supporting the threaded spindle. In this case, the threaded spindle is at a hydraulic balance when the MRF is in a liquid state. In terms of seals and bearings, this is an advantageous condition.

Finally, the invention relates to a clutch or brake, in particular a clutch or brake in a motor vehicle, comprising an actuator of the invention, in particular in accordance with one of the claims.

The invention will be explained in more detail below based on a number of exemplary embodiments and with reference to drawings.

BRIEF DESCRIPTION OF THE DRAWINGS

FIG. 6a is a perspective detail view of an embodiment of the threaded spindle of the actuator.

FIG. 6b is a top view of a helix of the threaded spindle of FIG. 6a.

FIG. 8 illustrates the clutch of FIG. 7 in an uncoupled condition including a detail of the magnetic field in FIG. 8a.

DETAILED DESCRIPTION

The figures are merely of a diagrammatic nature and are only provided for a better understanding of the invention. Identical elements have the same reference symbol. Details of the different embodiments may be combined with one another.

Figure 1:
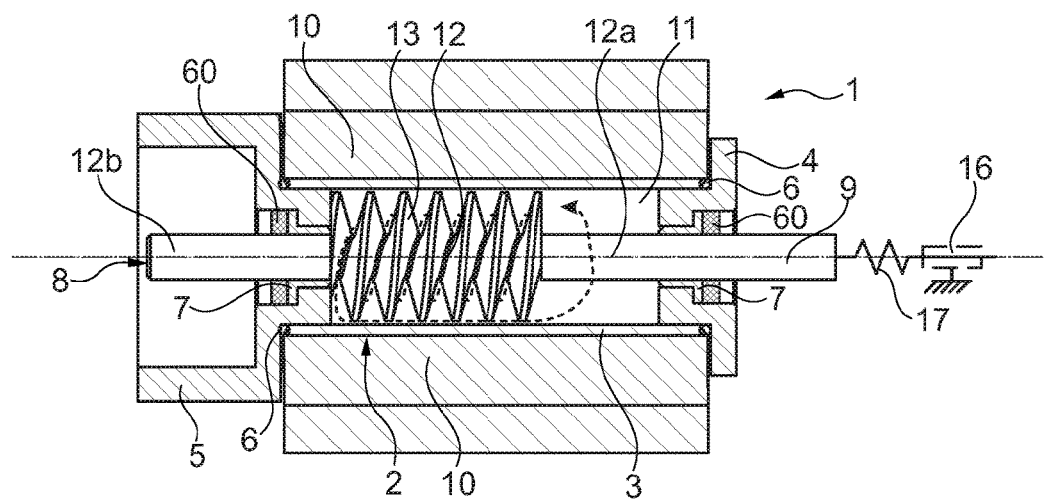
FIG. 1 is a diagrammatic representation of a magnetorheological actuator in which the magnetorheological fluid contained in the actuator is in a liquid state.

FIG. 1 is a diagrammatic representation of an embodiment of a magnetorheological actuator 1 of the invention. The actuator 1 has a housing 2 consisting of a tube 3 shaped like a hollow cylinder, a right-hand cover 4, and a left-hand cover 5. Covers 4, 5 may be screwed to the tube 3. The housing 2 is sealed between the tube 3 and the covers 4, 5 by means of a respective O-ring seal 6. A respective slide bearing 7 is inserted in a bearing opening formed in each cover 4, 5.

The slide bearings 7 are used to mount a threaded spindle 8 in the housing 2. The spindle 8 has a spindle core 12 and a thread 13 formed thereon. On both sides of the thread 13 there are spindle core 12 sections 12a 12b having a cylinder-shaped outer contour. By means of the spindle core sections 12a, 12b the threaded spindle 8 is supported in the slide bearings 7 for rotation about its longitudinal axis 9 and for axial displacement in the direction of the latter. Seals 60, which will be described in more detail below, are provided to seal the spindle 8 towards the respective cover 4, 5. The threaded spindle 8 may be driven to rotate about its longitudinal axis 9 by means of a drive, which is not shown in the figures. On an end face, it is connected to a unit to be operated, e.g. a clutch 16 or a brake, which is not shown in any detail in FIG. 1. A spring 17 is shown between the threaded spindle 8 and the unit 16 to be operated. The spring 17 is intended to represent the forces that act between the threaded spindle 8 and the unit 16.

The housing 2 forms a sealed chamber containing a magnetorheological fluid 11, referred to as MRF 11, surrounding the threaded spindle 8 that is supported in the housing 2. The housing 2 is surrounded by magnets, e.g. in the form of solenoids, which may generate a switchable magnetic field that acts on the MRF 11 contained in the housing. In other words, in one state, the MRF 11 located in the housing and surrounding the threaded spindle 8 is not exposed to a magnetic field and is consequently liquid, and in a second state, the MRF 11 is exposed to a magnetic field and consequently solidifies due to its magnetorheological properties, which will be described in more detail below.

Figure 2:
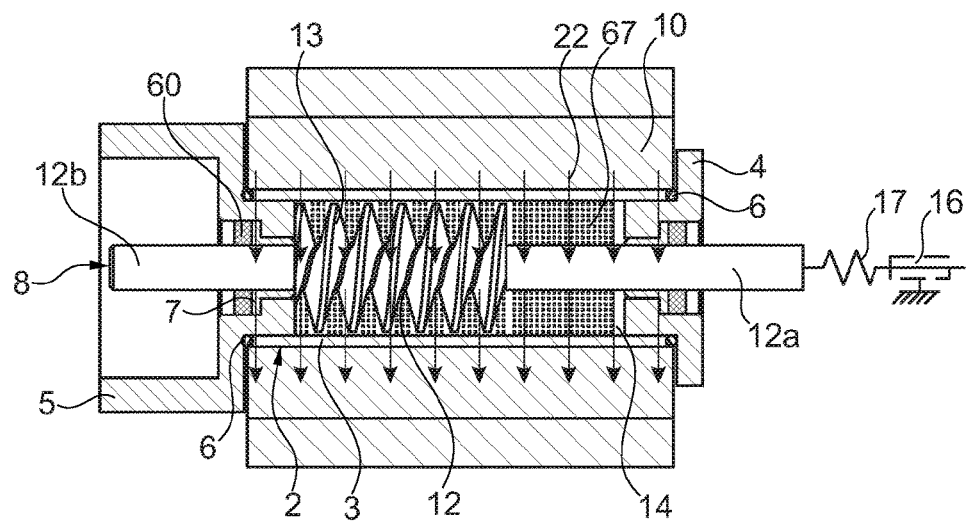
FIG. 2 is a diagrammatic representation of the actuator of FIG. 1 in which the MRF is in a solidified state and a threaded spindle of the actuator is at a standstill.

FIG. 2 illustrates the actuator 1 exposed to a magnetic field of a flux density B with the threaded spindle 8 at a standstill. The field lines 22 of the magnetic field are diagrammatically shown in the figure. A few milliseconds after the magnetic field has been applied, the MRF 11 transitions to the solidified state in which it is biphasic. Under the influence of the magnetic field, the polarizable particles 15 form chains 67 along the flux lines 22 of the magnetic field. As a consequence, the MRF 11 "sediments". The chains indicated in FIG. 2 form a firm structure, which may be considered a solid in accordance with the Bingham model explained above.

Figure 3:
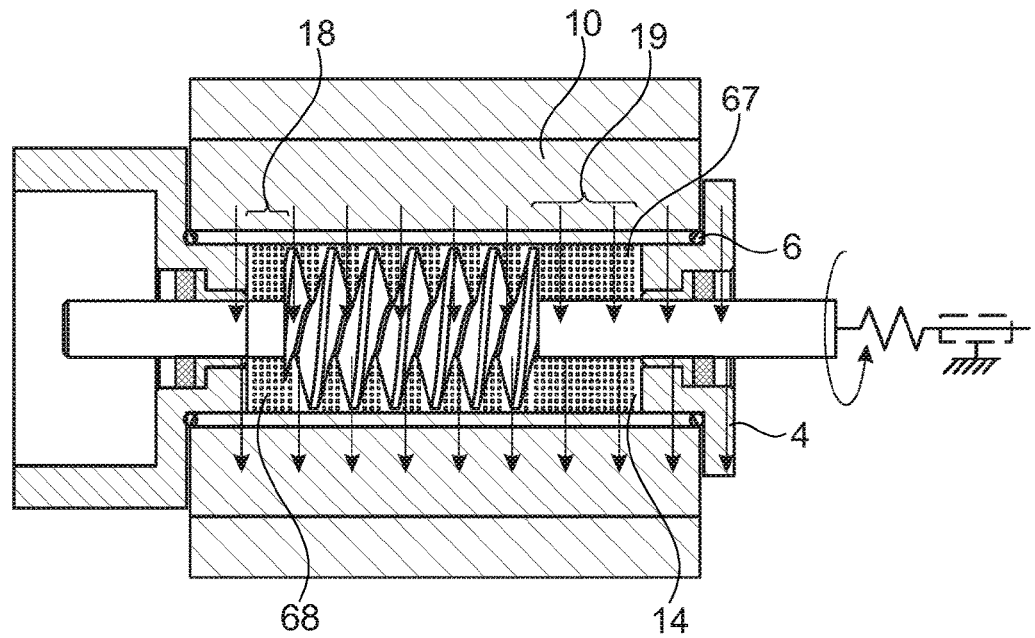
FIG. 3 is a diagrammatic representation of the actuator of FIGS. 1 and 2, in which the MRF is in a solidified state and the threaded spindle is rotating.
Figure 4:
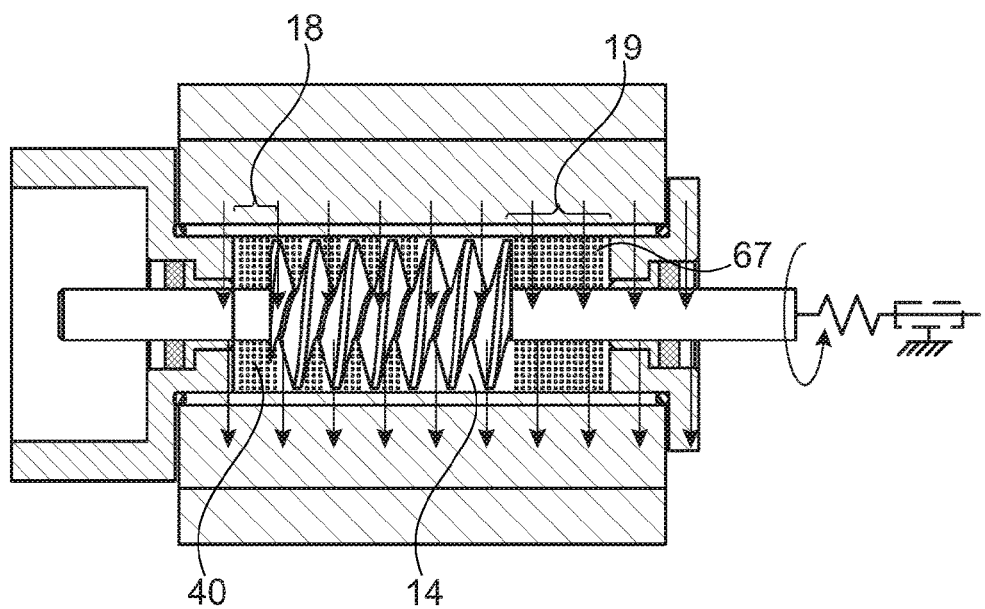
FIG. 4 is a diagrammatic representation of the actuator of FIGS. 1 to 3 in which the MRF is in a solidified state and the threaded spindle has continued to rotate compared to the state shown in FIG. 2.

For an operating action of the actuator 1 it is necessary for the threaded spindle 8 to rotate. This is shown in FIGS. 3 and 4. A magnetic field is applied and the MRF 11 has solidified. In the gap between the thread tips of the thread 13 and the inner wall of the tube 3 the MRF 11 is subjected to a shear stress that remains below the yield stress. In other words, this means that the force $F_{axial}$ of the spring 17 introduced into the MRF via the threaded spindle 8 is not sufficient to destroy or break up the chains of polarized particles 15 that have formed as a result of the magnetic field in the gap between thread 13 and tube 3. Thus the threaded spindle 8 rotates forward in the MRF 11 like in a solid body (to the right in FIG. 3) against the force of the spring 17. The maximum axial force that is attainable in this process is a function of the yield stress and the shear area.

FIG. 4 illustrates a state in which the shear stress applied to the MRF 11 exceeds the yield stress. When this value is exceeded, the chains formed of the polarized particles will break but will re-form immediately in regions of lower shear stress because the magnetic field continues to be effective. As a result, this means that the maximum axial force that may be generated has been reached. The thread 13 of the threaded spindle 8 slips in the chain structure of the MRF 11, causing the thread 13, which acts as an Archimedean screw, to convey parts of the MRF 11 to be conveyed backward (to the right in the figure) into a section 18 behind the thread 13 despite its solidified state. This state corresponds to the state described in the context of FIG. 1 (without a magnetic field), but with a highly viscous fluid.

In the section 18 behind the thread 13 in which parts of the MRF 11 are conveyed once the yield stress has been exceeded, the MRF 11 is no longer subjected to any shear stress, causing the particles 15 to re-form into chains. Due to the axial force of the spring 17 acting on the threaded spindle 8, pressure is higher in this section 18 than in the section 19 in front of the thread 13. Now the gap formed between the thread 13 and the interior wall of the chamber 2 has been dimensioned to allow the carrier liquid of the MRF 11 to pass through and flow from the section 18 located behind the thread 13 through the gap into the section 19 located in front of the thread 13. Since the particles 15 located in the section 18 behind the thread 13 have re-formed into chains, the result is an accumulation of solidified particles 15 in this location. Behind the thread 13, the chained particles 15 form a cushion against which the last thread surface of the thread 13 rests. The particles in section 18 behave like a solid, and the more particles 15 accumulate behind the thread 13, the greater the cushion formed in this location and the offset of the threaded spindle 8 in an axial direction will become.

Figure 5:
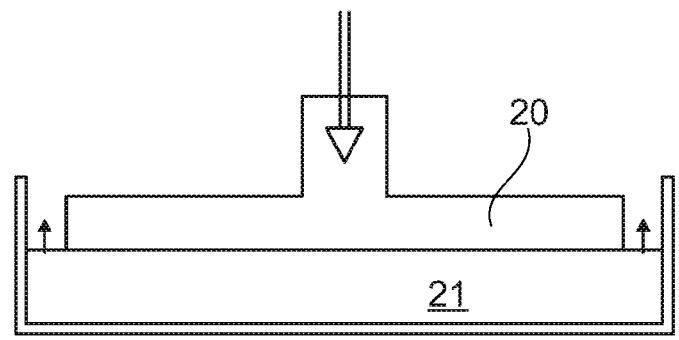
FIG. 5 is a schematic diagram of the transmission of pressure by means of small particles.

The aforementioned trapping of particles 15 in section 18 is not caused by the fact that the width of the gap between the thread 13 and the housing 2 is smaller than the size of the particles but rather by the fact that the particles 15 do not behave like a liquid but rather like a solid. This circumstance is illustrated in the principle sketch of FIG. 5, which shows a pusher 20 applying a downward force F to sand 21 present in a sandbox. Since the force applied to the sand 21 within the sand 21 made up of particles is not in the form of a hydraulic pressure (silo theory), the axial force acting on lateral grains of sand, i.e. on those beyond the pusher 20 is small. In this example, the grains of sand located in this area are held by gravity and cohesive forces between the grains. In the case of the particles of the MRF 11, the forces are the magnetic force and cohesive forces.

Figure 26:
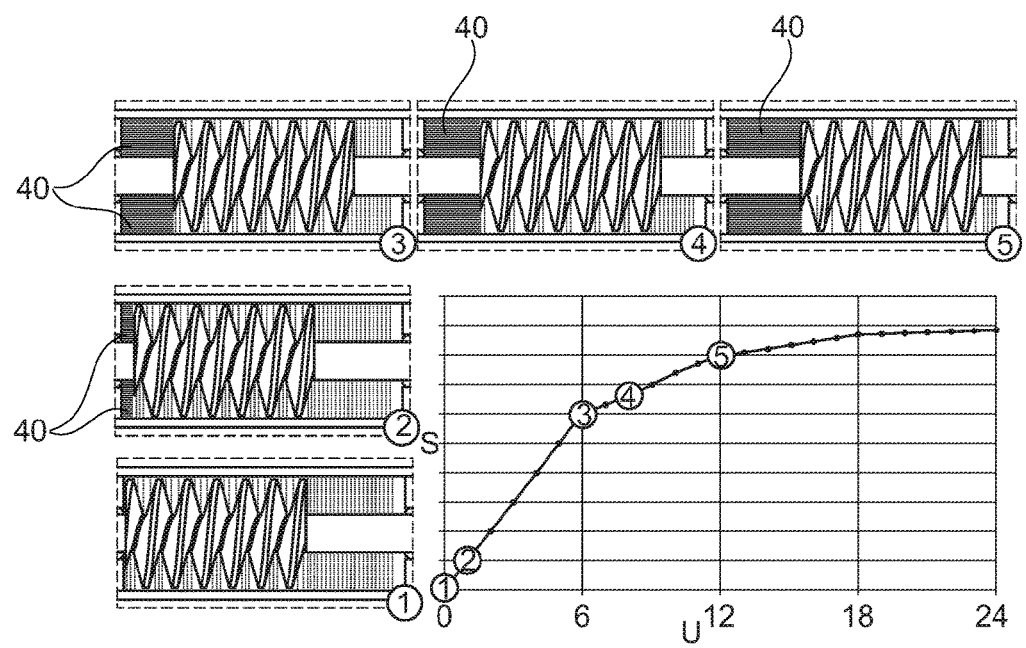
FIG. 26 is a representation of the principle of a magnetic particle cushion built-up in an actuator of the invention.
Figure 27A:
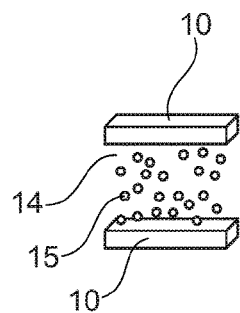
FIGS. 27a-d are representations of the behavior of an MRF.
Figure 27B:
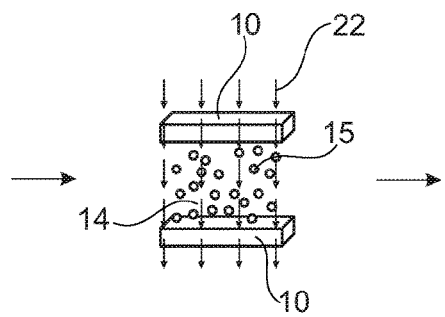
Figure 27C:
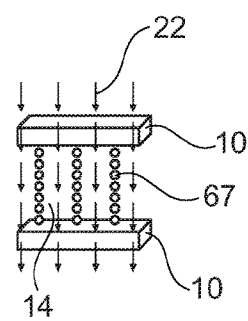
Figure 27D:
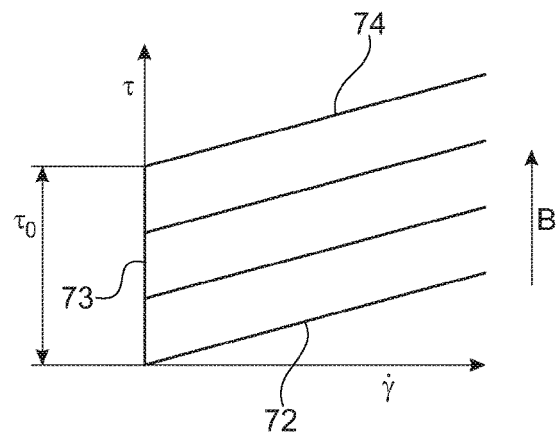

The axial displacement of the threaded spindle 8 as shown in FIG. 4 continues as long as further particles 15 of the MRF 11 continue to accumulate in the section 18 behind the thread 13. A maximum axial displacement is theoretically attained when all particles 15 are located in section 18. The process of building up the cushion of particles behind the thread 13, causing the axial displacement of the threaded spindle 8, is shown in a concise way in FIG. 26. The diagram of FIG. 26 illustrates a distance/revolution curve of the threaded spindle 8 (where the distance is understood to be the displacement of the spindle in an axial direction), while positions marked on this curve are represented in the drawings placed about the diagram. The curve has the shape of an asymptote consisting of linear sections.

The example of FIG. 26 is based on an MRF 11 with a concentration of 32 volume percent of iron particles. During the entire recording period, the magnetic field was switched on and the shear stress acting between the thread 13 and the housing 2 was greater than the yield stress. The threaded spindle 8 that was used had a single-start thread 13 with six windings. Thus the MRF 11 was considered to have been separated into eight volumes by the thread, namely the volumes of the six windings, the volume in the section 19 in front of the thread 13, also referred to as the "iron reservoir", and the volume in the section 18 behind the thread, also referred to as the "iron cushion".

On the onset, (shown at (1) in the diagram), an original particle volume concentration of 32 volume percent is present in all volumes. Once a first revolution has been completed (indicated at (2) in the diagram), the amount of particles of the last winding forms the cushion (on the left). As a result, the spindle 8 moves through a specific distance (u1). On the other side of the thread, i.e. in section 19, during this revolution, the first winding of the thread 13 removes a slice from the reservoir of section 19, the thickness of the slice corresponding to the axial distance the spindle 8 has travelled through. The volume of the removed slice is smaller than the volume of a winding of the thread 13. The amount of particles contained in the removed volume and the volume of carrier liquid are mixed with the volume of carrier liquid that has been displaced from the cushion (in section 18). For the original particle volume concentration of 32%, the particle volume content in the first winding of the thread 13 now only amounts to approximately 10%. In the remaining section 19, the particle volume concentration remains unchanged at 32% due to the solidified particle structure.

In accordance with the same principle, the following five revolutions of the spindle 8 will always convey the same amount of iron into section 18. In this process, the spindle 8 will be displaced by the same axial amount at every revolution (u1=u2=u3=u4=u5=u6). The result is the linear distance/revolution ratio illustrated up to (3) in the diagram. The slices removed in every revolution of the spindle 8 by the thread 13 are identical and result in identical particle volume concentrations in every winding of the thread 13.

At (3), the first winding that has the reduced particle volume concentration of 10% reaches section 18. In the course of a further revolution, this amount of particles is conveyed into section 18. As a result, the spindle 8 is displaced through a specific axial distance (u7) that is smaller than the axial distance (u1) due to the smaller amount of particles. During this revolution, the first winding of the thread 13 removes a slice from the reservoir in the section 19 on the other side of the thread, the thickness of the slice corresponding to the axial distance (u7) the spindle 8 has moved through. The amount of particles contained in the removed volume and the volume of the removed carrier fluid are mixed with the carrier fluid displaced from the cushion (in section 18). For the assumed original particle volume concentration of 32%, the particle volume concentration in the first winding of the thread 13 will now amount to a mere 3% for this revolution. In accordance with the smaller particle volume that is conveyed per revolution, the curve sections corresponding to the seventh to the twelfth winding (between (4) and (5) in the diagram) have a smaller linear gradient. Point (5) represents the state after 12 revolutions with u7=u8=u9=u10=u11=u12. The aforementioned reduction of the particle volume that is conveyed per winding repeats for every six further revolutions, resulting in a decrease of the linear gradient of the axial distance/revolution curve as shown in the diagram. From a purely mathematical point of view, the spindle will be displaced infinitely (until it reaches a stop), but the axial distance of the displacement will continue to decrease without ever reaching zero. Finally, the axial displacement/revolution curve approaches a horizontal.

Due to the formation of a particle cushion in the section 18 behind the thread 13, the attainable axial force increases considerably, in theory ad infinitum, compared to the axial force attainable by a displacement resulting from a shear stress that is below the yield stress. Thus the result is a significantly reduced dependence on the yield stress of an MRF 11, which has so far been the limiting factor when MRFs 11 were used.

As soon as the magnetic field is switched off or removed, the particle cushion formed in section 18 loses its solid-like properties. The MRF 11 behaves like a Newtonian liquid again. The axial force applied to the spindle 8 by the spring 17 no longer meets with any resistance except for the weak flow forces and the polarizable particles 15, which are no longer chained, flow through the gap between the thread 13 and the housing 2, resulting in a homogenization of the MRF 11. Due to the force $F_{axial}$ of the spring, the threaded spindle 8 moves back into its original position in which it contacts the left-hand cover 5 (see FIG. 1).

Figure 28A:
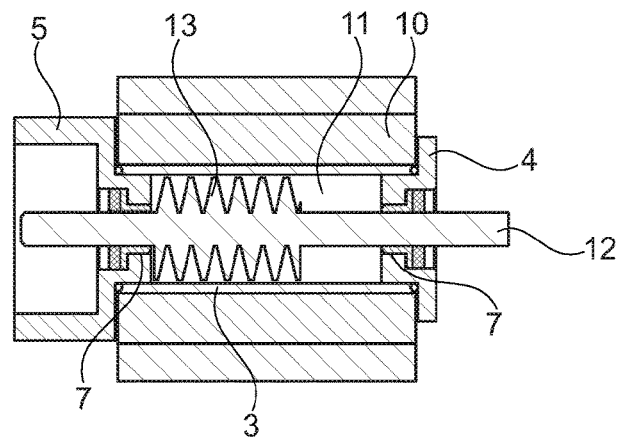
FIGS. 28a-28c are representations of the axial positioning of the actuator of FIGS. 1 to 4.
Figure 28B:
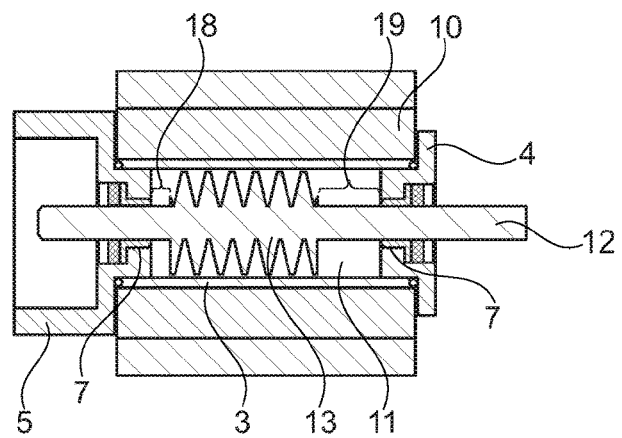
Figure 28C:
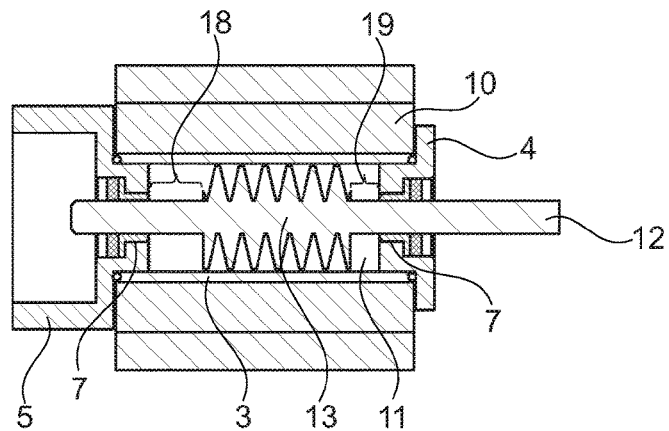

FIGS. 28a, 28b and 28c illustrate different stages of a displacement of the spindle in an axial direction as a result of a magnetic field of a field strength B generated by the magnet 10. In FIG. 28a, the spindle is in its original position adjacent to the left-hand cover 5. When the magnetic field is switched on, the spindle 13 initially moves to the position shown in FIG. 28b until the yield stress is reached. Making use of the particle cushion 40 build-up effect described above, the spindle 13 may continue to move in an axial direction out of the position shown in FIG. 28b until it reaches the final position shown in FIG. 28c.

Figures 6A, 6B:
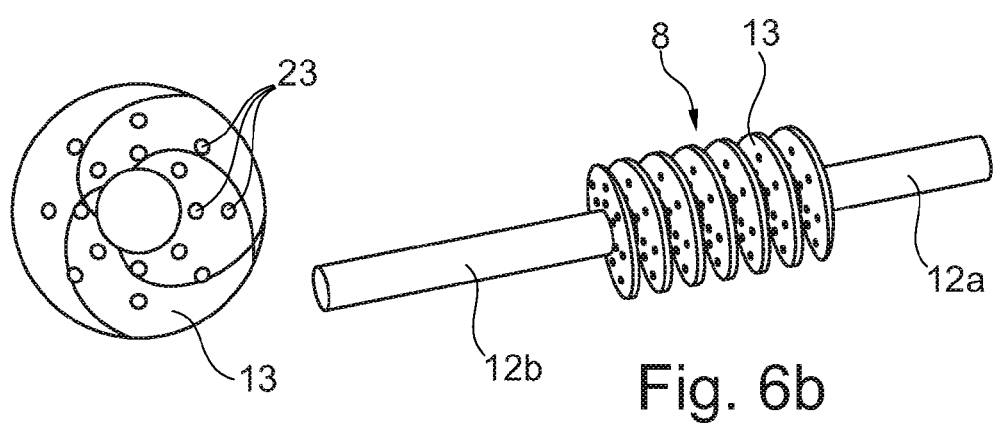

FIG. 6 illustrates an embodiment of a threaded spindle 8 with a thread 13 that has continuous bores 23 extending in a direction parallel to the longitudinal axis 9. The bores 23 form a connection between adjacent thread sections and may be provided in addition to or as an alternative to the gap between the thread 13 and the housing 2. As the cushion forms as described above, the bores 23 facilitate a flow of carrier fluid from the section 18 behind the thread 13 into the section 19 in front of the thread 13.

Figure 7:
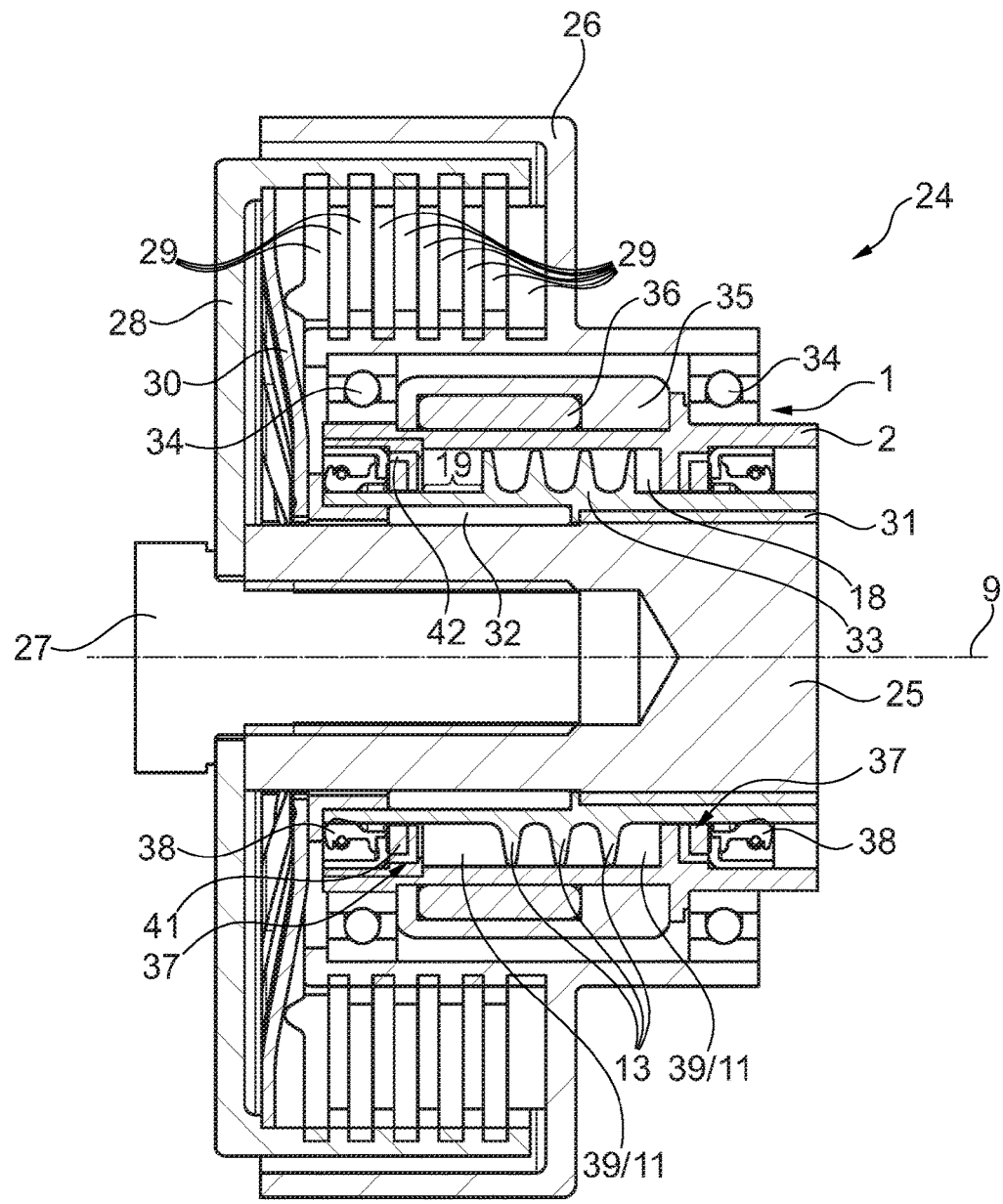
FIG. 7 is a sectional view of a specific embodiment of a clutch including a magnetorheological actuator in a coupled condition.

FIG. 7 is a sectional view of a specific embodiment of a clutch 24 in accordance with the invention, including a magnetorheological actuator 1 in accordance with the invention. The clutch 24 is shown in an engaged state. FIG. 7 shows a motor shaft 25 as a drive element and a pulley 26 as a power take-off element. A central screw 27 connects the motor shaft 25 to a clutch flange 28. The clutch flange 28 may be moved into frictional contact, i.e. engaged, with the pulley 26 via discs 29, causing torque to be transmitted from the motor shaft 25 to the pulley 26 via the clutch flange 28 and the discs 29. A diaphragm spring 30 is supported on the clutch flange 28 on the one hand and on the disc assembly 29 on the other hand to pre-load the clutch 24 into the engaged state (self-closing clutch). The diaphragm spring 30 co-rotates with the motor shaft 25.

A thread sleeve 33 is disposed on the motor shaft 25 so as to co-rotate with the latter and to be axially displaceable in a longitudinal direction 9. Consequently, the thread sleeve 33 co-rotates with the motor shaft 25 and surrounds the latter. Between the thread sleeve 33 and the motor shaft, an axial guide 31 extending in the longitudinal direction 9, e.g. in the form of an axial toothing or of one or more slide blocks, and a slide bearing 32 are provided for this purpose. On its exterior side facing away from the motor shaft, the thread sleeve 33 is provided with a thread 13. In addition, it is supported on the diaphragm spring 30 on its end side.

A housing 2 of the actuator is supported in the pulley 26 by means of bearings 34. The housing 2, pulley 26, and motor shaft 25 are positioned relative to one another in an axial direction, i.e. in the longitudinal direction 9, and are not movable. Furthermore the housing 2 is rotationally fixed, does not co-rotate with the motor shaft 25 or the pulley 26, and is surrounded by a solenoid 36 received in an iron guide 35. The solenoid 36 is used to generate the switchable magnetic field, which is deflected by the iron guide 35 in the way shown in FIG. 8a. The thread sleeve 33 and the stationary housing 2 are not to be magnetic to allow the creation of a magnetic circuit between the iron guide 35 and the motor shaft 25. In order to make the most of the particle cushion effect described above, a magnetic field with field lines oriented in a radial direction should be generated in the cushion region, i.e. in the section 18 behind the thread 13.

The housing 2 is sealed towards the motor shaft 25 by two permanent magnet seals 37 and additionally by a respective radial shaft sealing ring 38.

Between the shaft 25 and the housing 2, a chamber 39 containing an MRF 11 is formed. The thread 13 of the thread sleeve 33 and thread sleeve sections adjacent to the thread 13 on both sides are received in the chamber 39 to allow the thread sleeve 33 to move in an axial direction in the chamber 39.

In the coupled state shown in FIG. 7, the MRF 11 contained in the chamber 39 is not exposed to a magnetic field. Consequently, it is liquid. The thread 13 of the thread sleeve 33 rotates in the liquid MRF 11. The MRF 11 flows through the helix of the thread 13 and through the gap between the thread 13 and the housing 2 as explained above with reference to FIG. 1. The flow forces only generate a weak axial force, which is transmitted from the thread sleeve 33 to the diaphragm spring 30 but remains far weaker than the pre-loading force of the spring. The pre-loading force of the diaphragm spring 30 urges the thread sleeve 33 away from the clutch flange 28, i.e. towards the right in FIG. 7. Thus the diaphragm spring applies a pressing force to the discs 29 in this direction, pressing the discs 29 together. Due to the resultant friction, the discs 29 transmit torque to the pulley 26. The explanations in the context of FIG. 1 also apply to the embodiment of the clutch 24 and actuator 1 of FIGS. 7 and 8 in a corresponding way.

Figure 8:
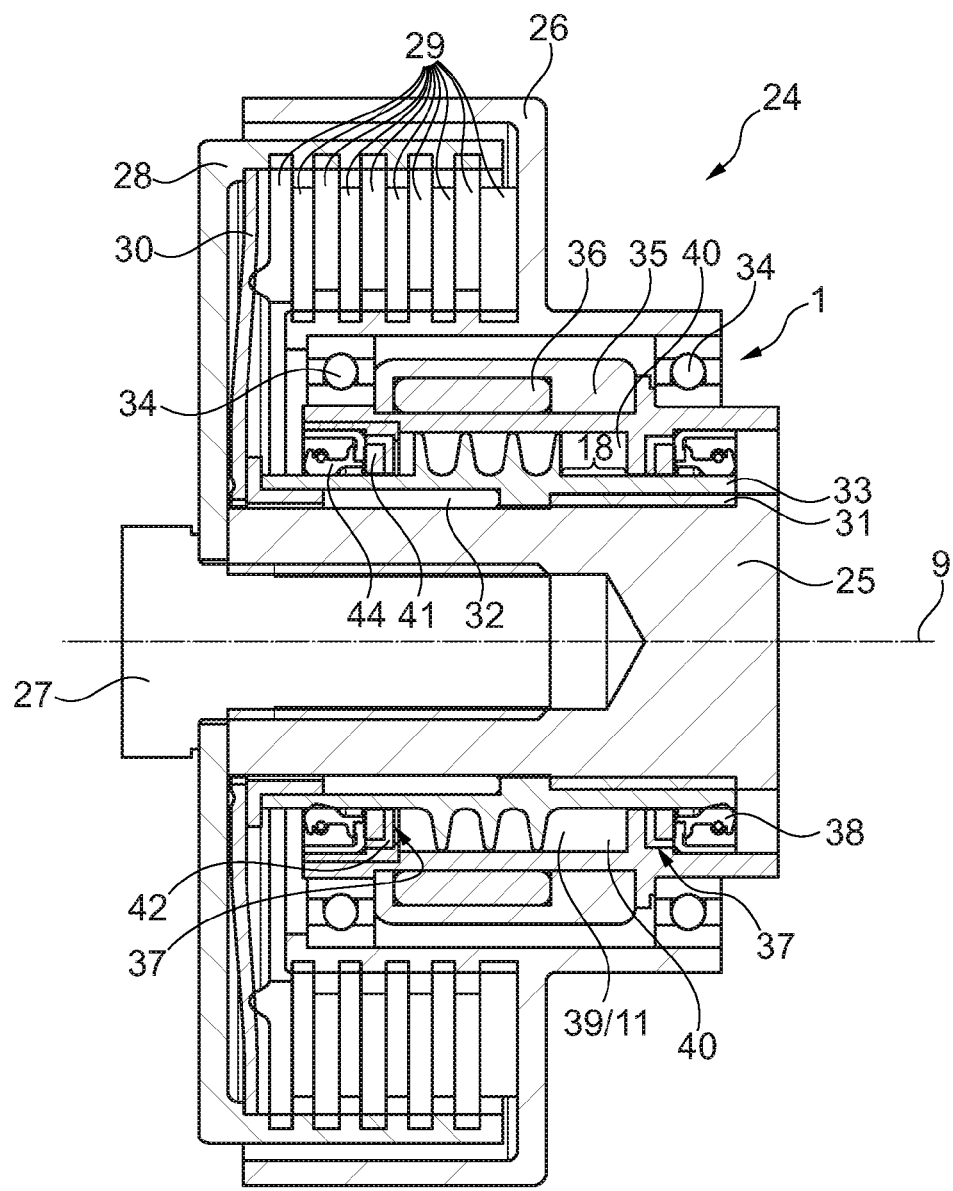

FIG. 8 illustrates the clutch 24 of FIG. 7 in a disengaged state. The MRF 11 is exposed to a magnetic field generated by the solenoid 36 and is consequently in a solidified state. The explanations in the context of FIGS. 1 to 6 and 26 apply in a corresponding way. Due to the solidification of the MRF 11, the thread 13 of the thread sleeve 33 rotates out of the solidified MRF 11. The gradient of the thread 13 is oriented in such a way that the thread sleeve 33 is displaced in an axial direction towards the clutch flange 28, i.e. towards the left in FIG. 8. Due to this axial displacement, the thread sleeve 33 exerts an axial force $F_{spindel}$ greater than the pre-load on the diaphragm spring 30, causing the thread sleeve 33 to be displaced in the direction of the clutch flange 28 against the pre-load of the diaphragm spring. This axial displacement causes the diaphragm spring 30 to be deformed, reducing and relieving the pressure it exerts on the discs 29. The frictional engagement between the discs 29 is reduced up to a separation of the discs 29 from one another. Once the discs 29 have completely separated, the clutch 24 is cleanly disengaged. At this point the drive of the motor shaft 25 may be stopped and the pulley 26 may continue to rotate independently thereof. An example of a possible application is the drive of a motor vehicle air conditioning system in a motor vehicle equipped with a start-stop system.

If the drive of the motor shaft 25 was not stopped while the clutch was disengaged, as it is the case with conventional clutches, e.g. with motor vehicle clutches, there would be friction between the thread sleeve 33 and the particle cushion 40 formed in section 18. Due to good lubrication properties of the MRF 11 and due to the non-magnetic connection between the cushion 40 and the thread 13, a friction coefficient of between 0.04 and 0.04 may be assumed.

A particular advantage of the build-up of a particle cushion 40 (indicated in FIG. 8) in the section behind the thread as described in the context of FIG. 26 is that the final angular position of the thread sleeve has no effect on the axial displacement thereof. If all or at least a major part of the particles of the MRF 11 are contained in the cushion 40, the thread sleeve remains in this final position as long as the magnetic field is maintained, no matter whether the motor shaft 25 rotates or is at a standstill. This final position is stable and may be maintained any desired amount of time. An engagement of the clutch 24 is achieved by switching off the magnetic field. As a result, the MRF 11 liquefies, the particle cushion 40 decreases, and the force of the spring 30 urges the thread sleeve 33 back into the initial position shown in FIG. 7. In this case, the engagement process may be very quick. It is to be pointed out that it may be delayed in time and may be carried out in almost any desired way by a controlled reduction of the magnetic field, e.g. by a progressive reduction of the magnetic field. A rotation of the motor shaft and thus of the thread sleeve 33 fixed for co-rotation therewith may accelerate the transition to the homogeneous state of the liquid MRF 11.

Figure 8A:
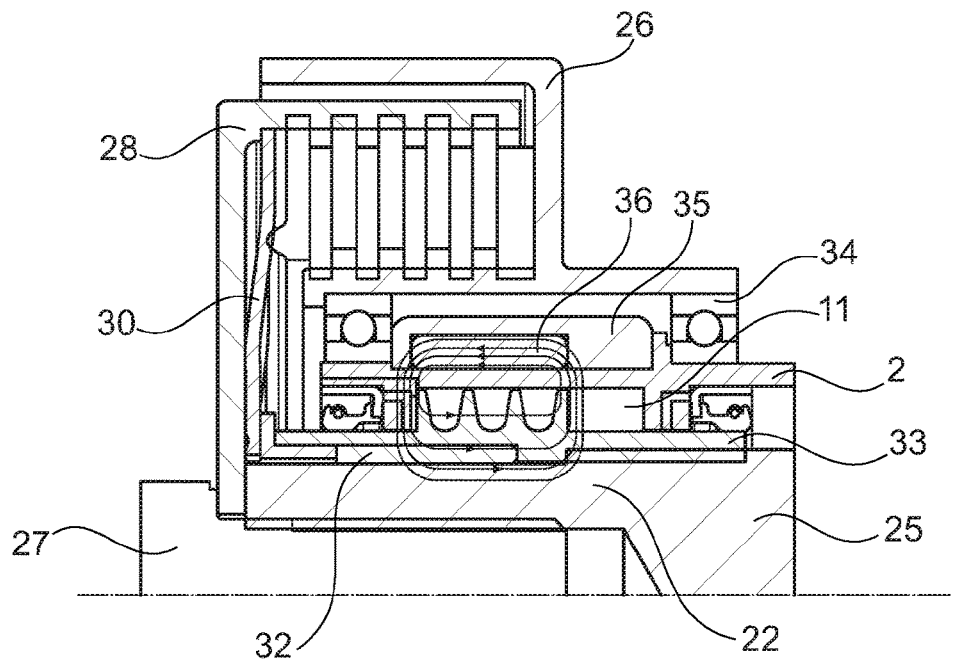

FIG. 8a illustrates the development of the magnetic field generated by the solenoid 36 on the basis of field lines 22. The field lines 22 extend in an axial direction through the solenoid 36 and the iron guide 35, then in a radial direction over the chamber 39 containing the MRF, then back in the opposite axial direction through the motor shaft 25 and again in a radial direction from the latter back through the chamber 39 containing the MRF 11. It is to be pointed out that the motor shaft 25 and the housing 2 are made of non-magnetic materials to provide this orientation of the field lines.

Figure 9:
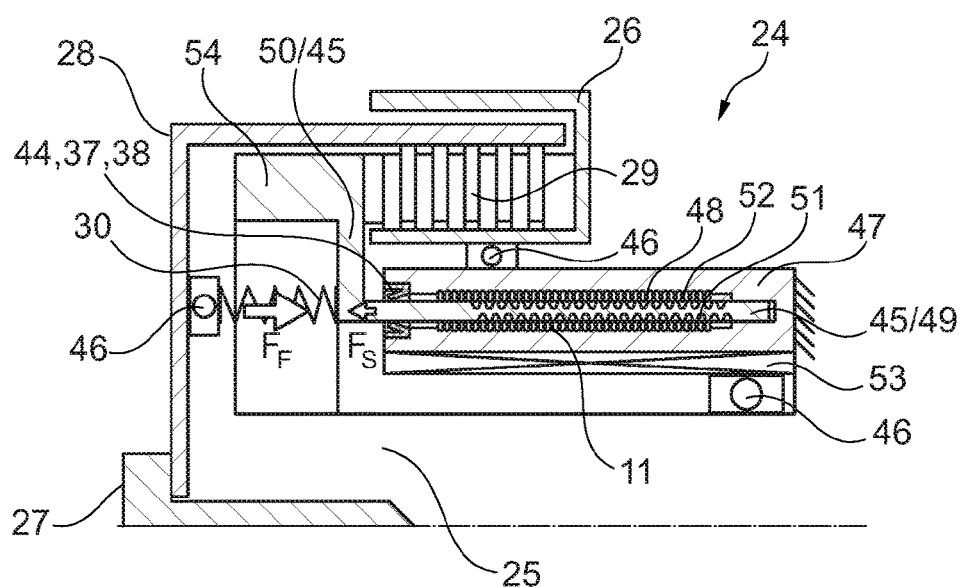
FIG. 9 is a sectional partial view of a second embodiment of a clutch with a magnetorheological actuator.

FIGS. 9 to 16 illustrate another embodiment of a clutch 24 of the invention including a magnetorheological actuator 1. FIG. 9 shows the clutch in an engaged state. FIG. 9 shows a motor shaft 25 as a drive element and a pulley 26 as a power take-off element. The motor shaft 25 is connected to a clutch flange 28 by a central screw 27. The clutch flange 28 may be moved into frictional engagement with, i.e. coupled to, the pulley 26 via discs 29 to transmit torque from the motor shaft 25 to the pulley 26 via the clutch flange 28 and the discs 29. A spring, e.g. in the form of a diaphragm spring 30 not shown in any detail in the figure, is fixed to the clutch flange 28 on one side and to a thread sleeve 45 on the other side. Via the thread sleeve 45 the spring is fixed to the disc assembly 29 to pre-load the clutch 24 into the engaged state (self-closing clutch). The diaphragm spring 30 co-rotates with the motor shaft 25 but is supported relative thereto by a bearing 46.

The pulley 26 is supported on a housing 47 by a bearing 46. The motor shaft 25 is likewise supported on the housing by a bearing 46. The housing 47 is fixed, i.e. it may neither move in an axial direction nor rotate relative to the motor shaft 25 and the pulley 26. It has the shape of a hollow cylinder and surrounds the entire circumference of the motor shaft 25. In the housing 47, an essentially cylinder-shaped chamber 48 is formed that is open in an axial direction to one side of the housing (to the left in FIG. 9). On the opposite side, the chamber 48 is closed by the housing 47. In the chamber 48, the thread sleeve 45 is supported for rotation and axial displacement. A third bearing 54 is provided to support the spring 30 relative to the clutch flange 28.

Figure 15:
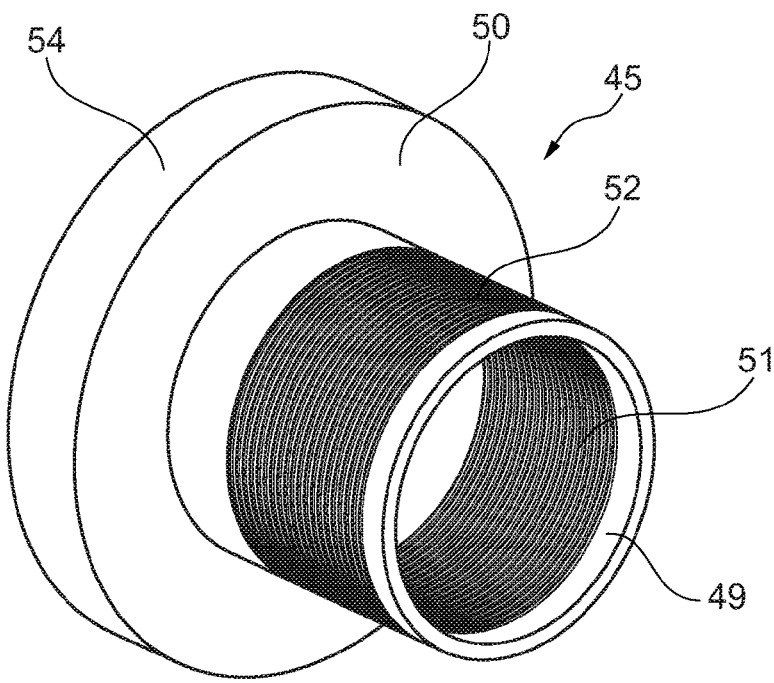
FIG. 15 is a perspective view of an embodiment of a sleeve of the actuator of the clutches of FIGS. 9 to 14.

FIG. 15 is a perspective view of the thread sleeve 45. It has a sleeve section 49 extending in an axial direction and a collar 50 extending in an essentially radial direction. The sleeve section 49 is provided with an interior thread 51 and with an exterior thread 52. The radially outer end of the thread sleeve 45 is provided with a great mass 54 to provide the thread sleeve 45 with a great moment of inertia. The chamber 48 is sealed between the thread sleeve 45, in particular sleeve section 49, and the housing 47. For this purpose, the sealing concept of a permanent magnet seal 37, 41 as described in the present application, potentially in combination with a radial shaft seal 38, may be used. The chamber 48 that is sealed in this way contains an MRF 11. A solenoid 53 for generating a switchable magnetic field is provided between the housing 47 and the bearing 46.

Figure 10:
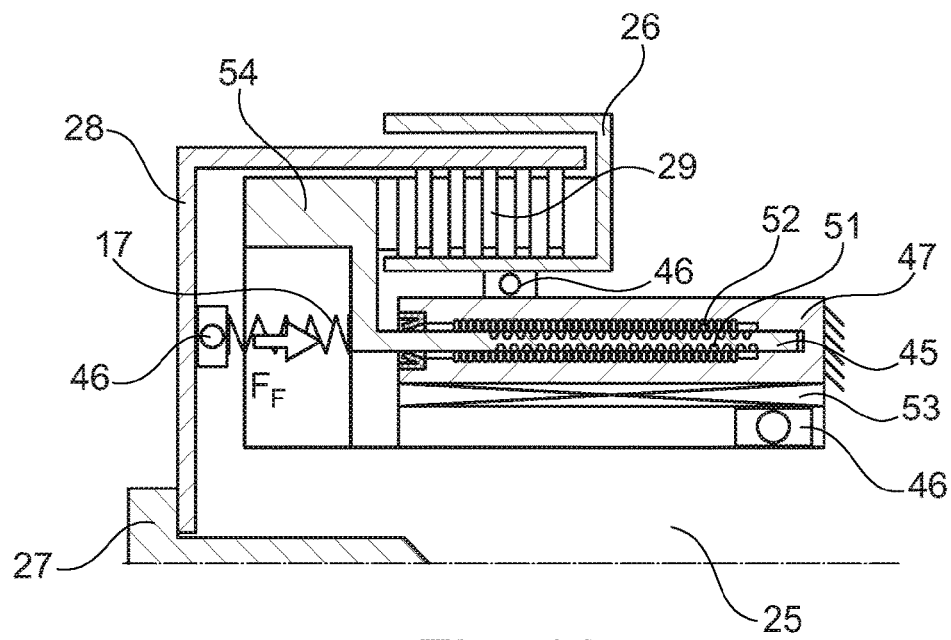
FIG. 10 illustrates the clutch of FIG. 9 at a standstill.

FIG. 10 illustrates the clutch 24 when the motor shaft 25 does not rotate. The clutch 24 is closed because the spring 30 applies a force $F_F$ acting in an axial direction to the collar 50 of the thread sleeve 45. Fs is the counter-force applied to the spring 30 by the collar 50, i.e. through the thread sleeve 45. When no magnetic field is applied, the MRF 11 is liquid.

Figure 11:
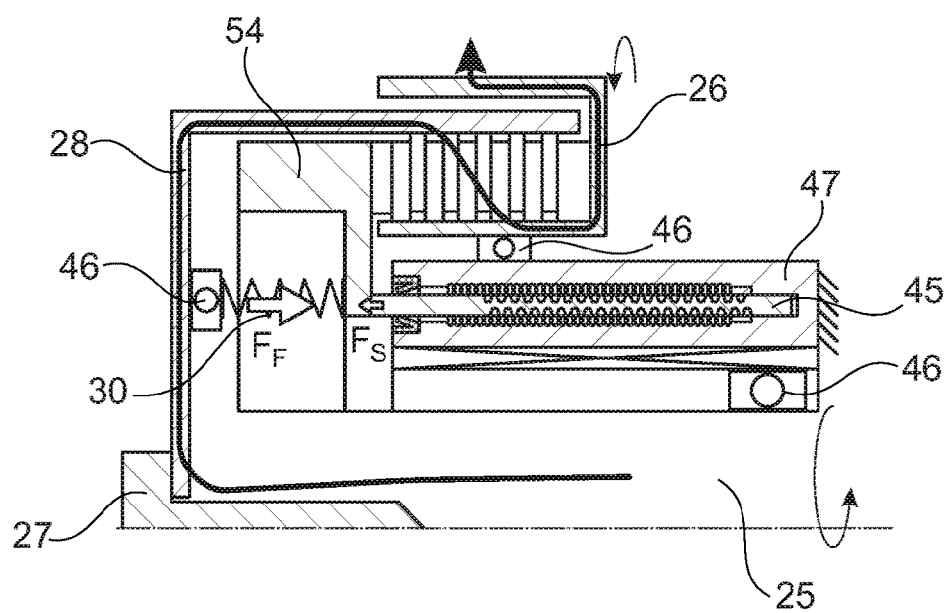
FIG. 11 illustrates the clutch of FIGS. 9 and 10 during operation in a coupled condition.

FIG. 11 illustrates the clutch 24 in an engaged state during operation as the motor shaft 25 rotates and the magnetic field is switched off. The clutch flange 28 co-rotates with the motor shaft 25, discs 29, pulley 26, thread sleeve 45, and spring 30. The MRF 11 is liquid and the thread sleeve 45 continuously rotates in the liquid MRF 11. As a result, a weak axial force is generated, which the thread sleeve 45 applies to the spring 30 counter to the pre-load and which is directed against the pressing force of the clutch. However, this force is weaker than the pre-loading force of the spring 30, so that the clutch remains engaged and the entire torque is transmitted. Due to the mass 54, the rotating thread sleeve 45 has a high kinetic energy.

Figure 12:
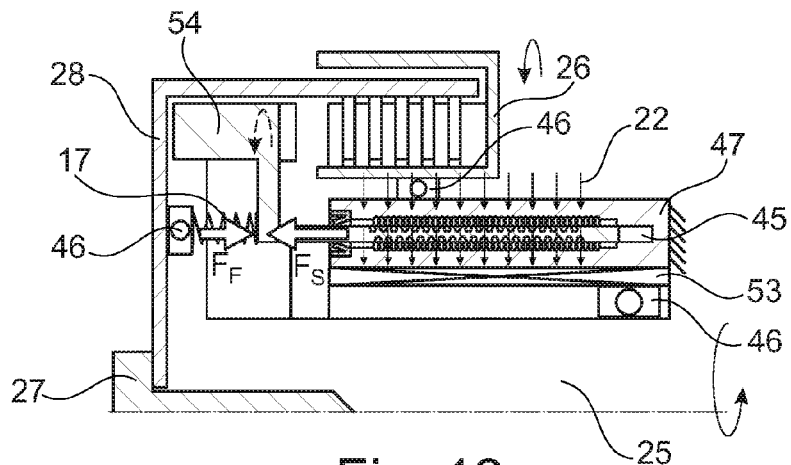
FIG. 12 illustrates the clutch of FIGS. 9 to 11 during operation at the beginning of the uncoupling process.

FIG. 12 illustrates the clutch 24 at the beginning of a disengagement process. The motor shaft 25 drives the clutch flange 28 and the magnetic field is switched on, causing the MRF 11 to solidify within a few milliseconds. The threads 51, 52 of the threaded spindle 45 rotate out of the solidified MRF 11, causing the threaded spindle 45 to be axially displaced out of the chamber 48. The axial force that is generated in this process is greater than the pre-load of the spring 30 and causes the clutch 24 to start to disengage. Immediately after the response of the actuator 1, the thread sleeve is disengaged from the discs. Consequently, no more torque is transmitted from the motor shaft 25 thereto. Yet to be able completely to open and disengage the clutch and to cleanly separate the discs 29 from one another, the thread sleeve 45 needs to continue to rotate until it has moved completely out of the chamber 48 against the load of the spring 30. The thread sleeve 45 receives this energy of rotation due to inertia via the mass 54. The gradient of the threads 51, 52 determines the axial speed of the sleeve 45 as it rotates out of the chamber. Thus immediately after the beginning of the disengagement process, i.e. as soon as the sleeve 45 is out of contact with the discs 29, the drive of the motor shaft 25 may be switched off.

Figure 13:
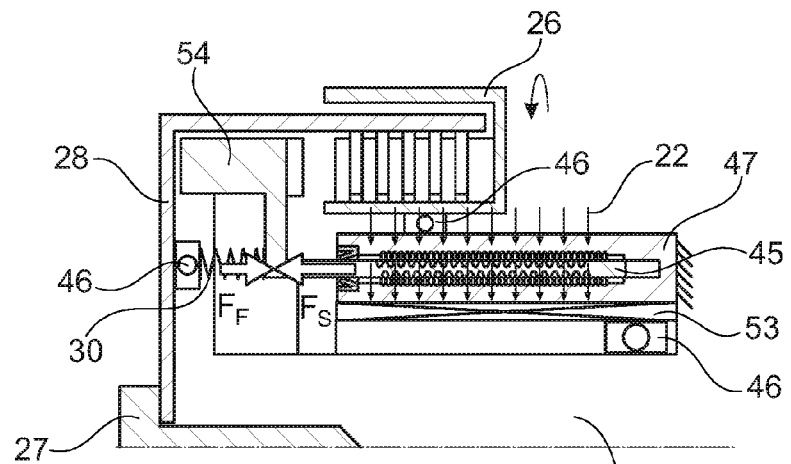
FIG. 13 illustrates the clutch of FIGS. 9 to 12 during operation in an uncoupled condition.
Figure 14:
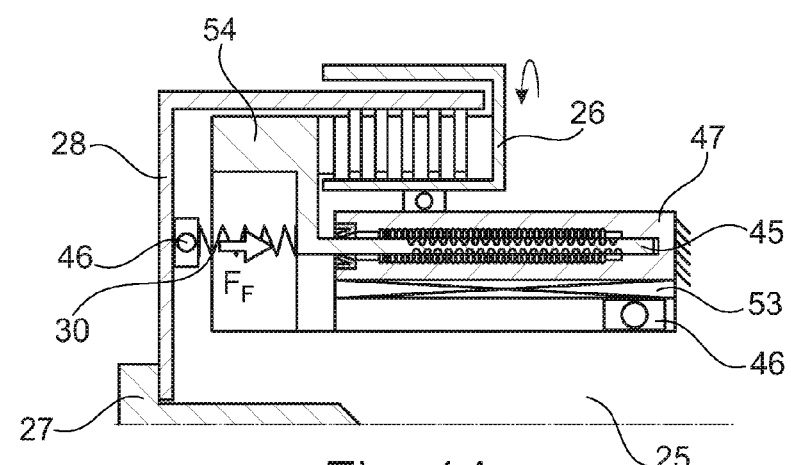
FIG. 14 illustrates the clutch of FIGS. 9 to 13 during a coupling/engagement process.

FIG. 13 illustrates the clutch 24 in a completely disengaged state. The open clutch 24 allows the motor shaft 25 to rotate freely. As long as required, the MRF 11 remains under the influence of the magnetic field and in a solidified state. Thus the pressing force of the spring 30 applied to the clutch flange 28 by the spring 30 remains balanced. To engage the clutch 24, the magnetic field is simply switched off. This process is shown in FIG. 14. Once the magnetic field has been switched off, the MRF liquefies within milliseconds and the axial force the MRF applied to the thread sleeve 45 is removed. Due to the pre-loading force the spring 30 applies to the thread sleeve 45, the thread sleeve 45 moves into the housing 47. The principle of the clutch shown in FIGS. 9 to 14 is advantageous because the engagement speed may be very high and may be adjustable by controlling the viscosity of the MRF 11.

Figure 18:
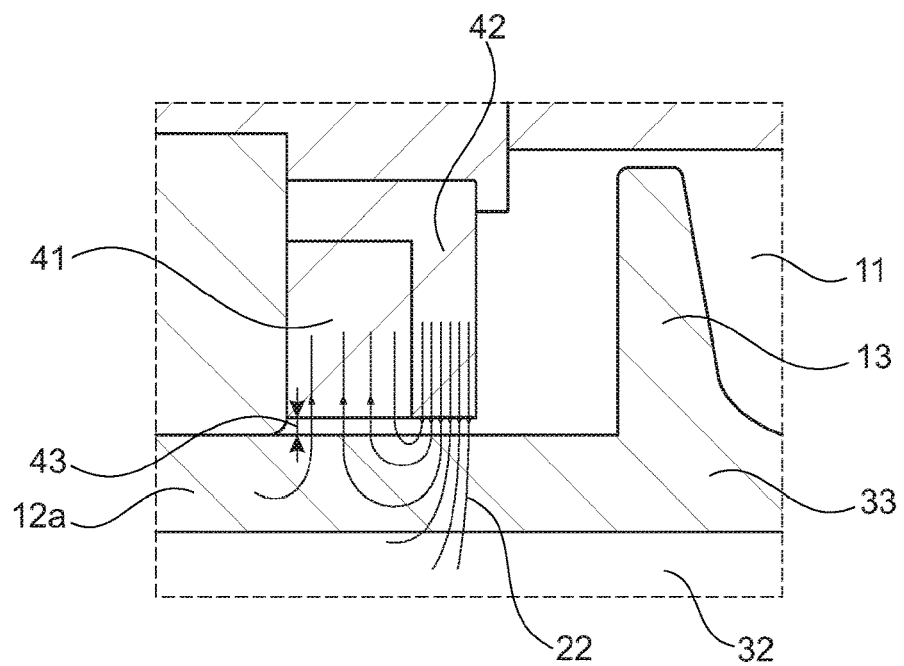
FIG. 18 illustrates a first embodiment of a seal for a magnetorheological actuator of the invention.
Figure 19:
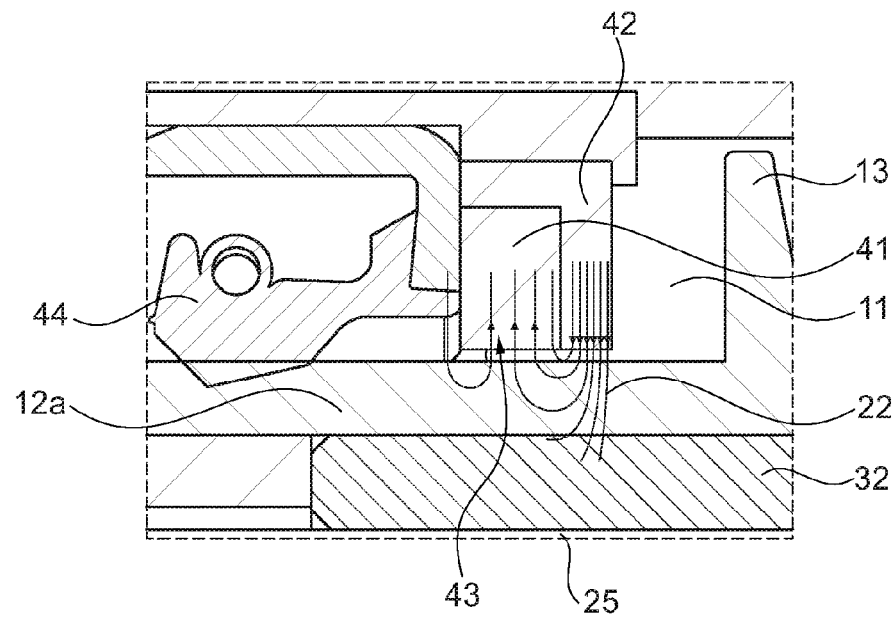
FIG. 19 illustrates a second embodiment of a seal for a magnetorheological actuator of the invention.

Sealing concepts for the actuators and clutches of the invention are shown in detail in FIGS. 18 and 19. The polarizable particles 15 in the MRF 11 require suitable sealing solutions such as permanent magnet seals. The principle of a permanent magnet seal is based on locking the polarizable particles 15 in a gap 43 to be sealed due to solidification or formation of chains. For this purpose, a permanent magnet 41 generates a permanent magnetic field in the gap 43 to be sealed, causing the particles to form chains. As a result, the particles are unable to leave the gap 43. An iron ring 42 is provided to orient the field lines of the permanent-magnet field in the gap 43 in a desired way. In a case in which such a permanent-magnet seal is insufficient, for instance because the carrier liquid may continue to pass through the gap 43, a radial shaft seal 44 may additionally be provided. The radial shaft seal 44 is disposed on the permanent-magnet side facing away from the MRF 11 to avoid contact with the wear-inducing particles of the MRF 11. In this way, the particles trapped in the magnetic field should be prevented from damaging the sealing lip.

Figure 20A:
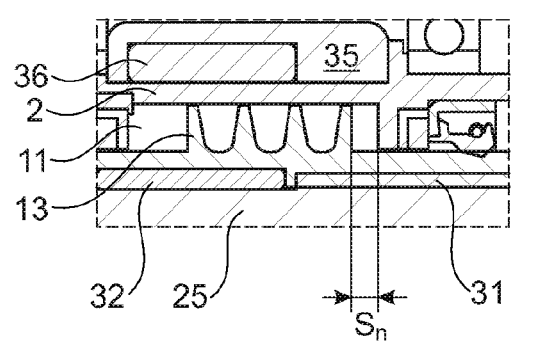
FIG. 20a is a sectional view of a detail for clutch wear compensation in a new clutch.
Figure 20B:
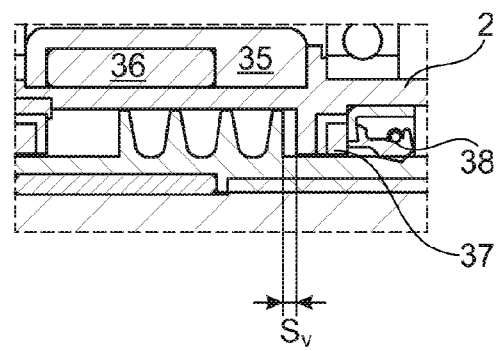
FIG. 20b is a sectional view of a detail for clutch wear compensation in a worn clutch.

The actuators 1 of the clutches need to factor in the wear on the clutch. A pertinent representation is shown in FIGS. 20a and 20b. FIG. 20a illustrates the actuator of a new clutch without any wear. The thread 13 is axially spaced apart by a gap of a width $S_n$. Wear on the clutch 24 will cause the thread sleeve 33/the threaded spindle 8 to be displaced further and further against the feeding direction in the chamber, i.e. away from the clutch flange 28. The distance or gap between the thread 13 and the housing 2 thus needs to be dimensioned in a way to ensure that the spindle 33, 8 and the thread 13 will never be in contact with the housing 2. Otherwise the axial force to be applied to the discs 29 by the diaphragm spring 30 to ensure a correct engagement would no longer be applied to the discs 29 but would rather be introduced into the housing 2 via the thread 13, causing the clutch 24 to slip. The actuator 1 of a clutch that is subject to a specific amount of wear is shown in FIG. 20b. In this figure, the gap between the thread 13 and the housings 2 only has a width $S_v$.

Figure 16A:
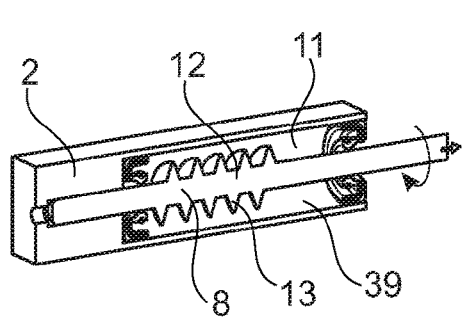
FIG. 16a illustrates an alternative embodiment of the actuator of the clutches of FIGS. 9 to 14 without the influence of a magnetic field.
Figure 16B:
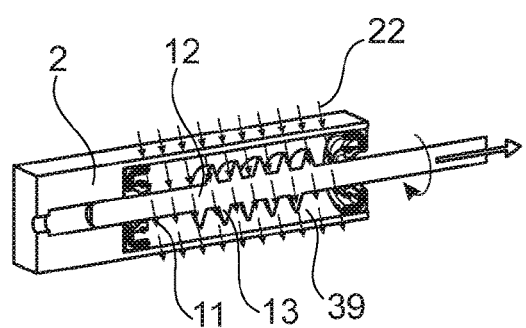
FIG. 16b illustrates the alternative embodiment of the actuator of the clutches of FIGS. 9 to 14 under the influence of a magnetic field.

FIGS. 16a and 16b illustrate an alternative embodiment of an actuator that may be used to operate the clutch 24 of FIGS. 9 to 17. FIG. 16a illustrates the actuator in a condition in which it is not exposed to a magnetic field and FIG. 16b illustrates the actuator in a condition in which it is exposed to a magnetic field. Instead of an actuator with the thread and thread sleeve, one or more actuators 1 as shown in FIGS. 16a and 16b may be provided to operate the clutch 24. The actuator 1 essentially corresponds to the actuator 1 shown in FIGS. 1 to 6. In the illustrated embodiment, its housing 2 and its threaded spindle 8 consist of an aluminum alloy. If such an actuator 1 is used, the clutch 24 may have particularly small dimensions.

Figure 17:
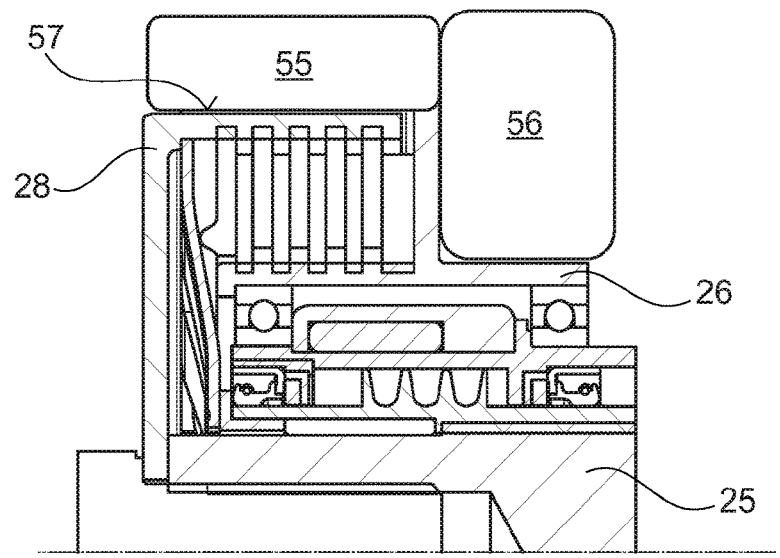
FIG. 17 is a partially sectional view of a specific embodiment of a clutch with a magnetorheological actuator.

FIG. 17 illustrates an embodiment of a clutch 24 in accordance with FIGS. 7 and 8. The clutch is equipped with an absorber 55 and a damper 56. The absorber 55 essentially consists of a mass element circumferentially surrounding the clutch flange 28 and disposed thereon with an elastomer element 57 provided in between. The absorber 55 can absorb specific disturbing frequencies present in the drive train. The damper 56 is disposed on the pulley 26 and is used to dampen frequencies essentially independently of their value.

Figure 21A:
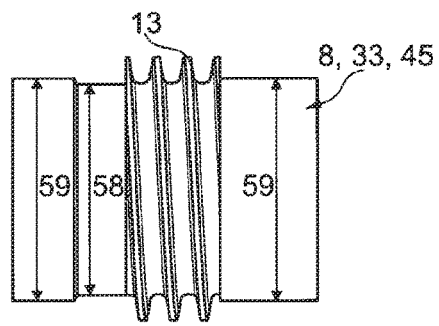
FIG. 21a is a lateral detail view of an embodiment of a threaded spindle of a magnetorheological actuator.
Figure 21B:
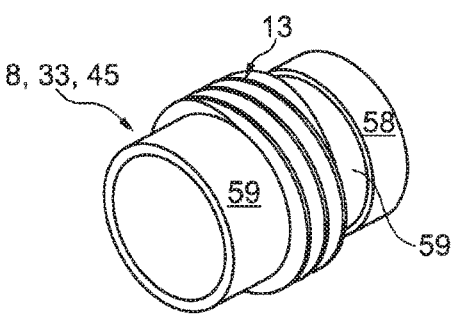
FIG. 21b is a perspective detail view of a threaded spindle of a magnetorheological actuator.
Figure 22A:
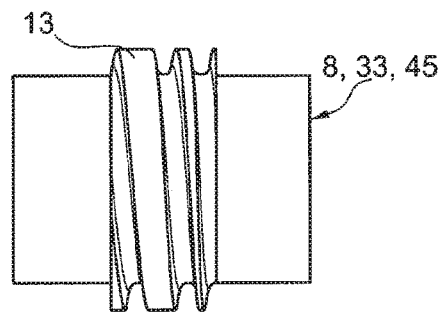
FIG. 22a is a lateral detail view of an embodiment of the threaded spindle of a magnetorheological actuator.
Figure 22B:
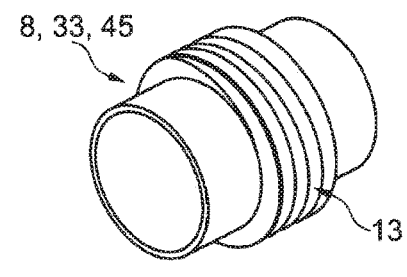
FIG. 22b is a perspective detail view of an embodiment of a threaded spindle of a magnetorheological actuator.
Figure 23A:
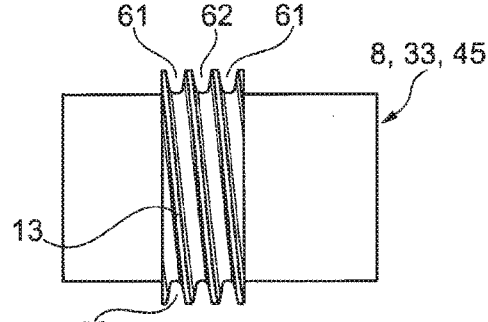
FIG. 23a is a lateral detail view of an embodiment of a threaded spindle of a magnetorheological actuator.
Figure 23B:
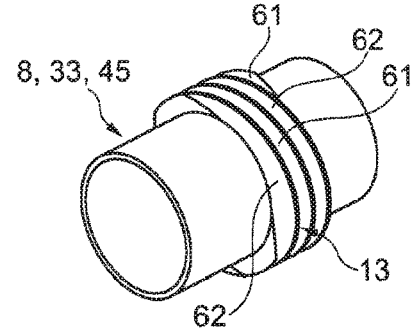
FIG. 23b is a perspective detail view of an embodiment of a threaded spindle of a magnetorheological actuator.
Figure 24A:
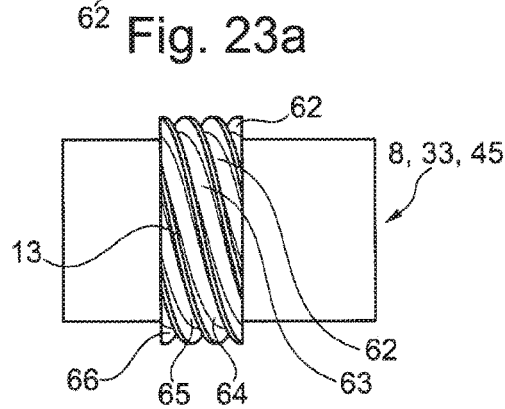
FIG. 24a is a lateral detail view of an embodiment of a threaded spindle of a magnetorheological actuator.
Figure 24B:
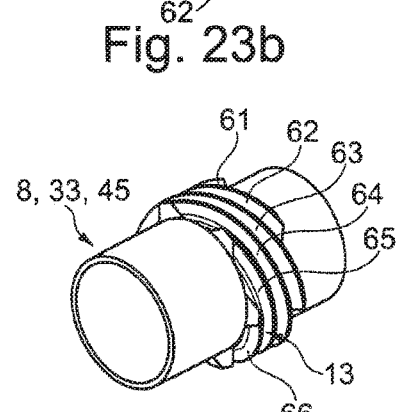
FIG. 24b is a perspective detail view of an embodiment of a threaded spindle of a magnetorheological actuator.

FIGS. 21a to 24b illustrate different embodiments of threads 13, 51, 52 of the threaded spindle 8/thread sleeve 33 or 45. FIGS. 21a and 21b illustrate a thread whose core diameter 58 is smaller than the exterior diameter 59 of the threaded spindle/thread sleeve. The exterior diameters 59 need to be identical on both sides of the thread to maintain a hydraulic balance in the actuator 1. This alternative allows the axial displacement of the threaded spindle/thread sleeve to be quick and the particle cushion 40 to build up quickly because every revolution of the thread conveys a relatively large volume (namely the volume of a helix section) into a small gap in the region of the exterior diameter 59. FIGS. 22a and 22b illustrate a thread with a non-linear thread gradient. In the region of a steep thread gradient, particles located in the helixes are quickly moved in an axial direction. In the end region of the thread (close to section 18), the gradient is not as steep, allowing the flattest possible surface of the thread to rest on the particle cushion 40. The embodiment of FIGS. 23a and 23b has a double-start thread with a first helix 61 and a second helix 62. The embodiment of FIGS. 24a and 24b has a six-start thread with a first helix 61, a second helix 62, a third helix 63, a fourth helix 64, a fifth helix 65, and a sixth helix 66. A multi-start thread allows a particularly fast particle cushion 40 build-up because of a multiplied thread gradient. Yet the maximum axial displacement is the same as with a single-start thread.

The embodiments of FIGS. 21a to 24b may be combined in a particularly advantageous way. An example of such a combination is a multi-start thread with a varying spindle core diameter. Such a combination makes sense because every parameter (number of starts and core diameter) has a different influence on the axial distance/revolution curve that may be attained by the thread. A specific selection of the thread parameters thus allows the axial displacement, its speed, and the resultant disengagement time to be optimized.

Figure 25:
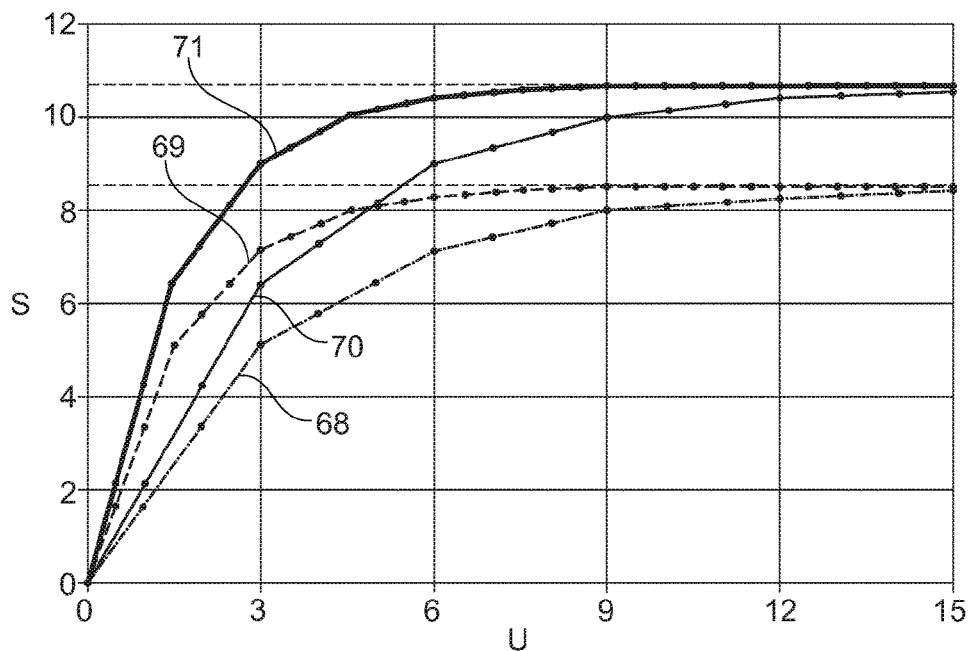
FIG. 25 is a revolution/distance diagram for various embodiments of a threaded spindle.

FIG. 25 represents a comparison between various threads of different thread parameters in one axial distance/revolution diagram. The revolutions U the spindle 8 passes through are plotted on the abscissa. The axial distance S the spindle has traveled through as a result of the interaction with the MRF 11 is plotted on the ordinate. The diagram illustrates four different axial distance/revolution curves. Curve 68 pertains to a spindle 8 with a single-start thread 13. Curve 69 pertains to a spindle 8 with a double-start thread 13 (embodiment of FIGS. 23a and 23b). Curve 70 pertains to a spindle 8 with a thread 13 wherein the spindle has varying diameters in accordance with the embodiment of FIGS. 21a and 21b. Curve 71 pertains to a spindle 8 with a double-start thread 13 (in accordance with the embodiment of FIGS. 23a and 23b) in combination with varying spindle diameters (embodiment of FIGS. 21a and 21b). The diagram of FIG. 25 clearly shows that due to its quick response, the spindle of curve 71 is to be preferred over the other spindles.

LIST OF REFERENCE SYMBOLS 1 actuator
2 housing
3 tube
4 right-hand cover
5 left-hand cover
6 sealing O-ring
7 slide bearing
8 threaded spindle
9 longitudinal axis
10 magnet
11 magnetorheological fluid
12 thread core
12a thread core section
12b thread core section
13 thread
14 carrier liquid
15 magnetically polarizable particles
16 unit to be operated
17 spring
18 section (behind thread)
19 section (in front of thread)
20 pusher
21 sand
22 field lines
23 bore
24 clutch
25 motor shaft
26 pulley
27 central screw
28 clutch flange
29 discs/disc assembly
30 diaphragm spring
31 axial guide
32 slide bearing
33 thread sleeve
34 bearing
35 iron guide
36 solenoid
37 permanent magnet seal
38 radial shaft sealing ring
39 chamber
40 cushion
41 permanent magnet
42 iron ring
43 gap
44 radial shaft seal
45 thread sleeve
46 bearing
47 housing
48 chamber
49 sleeve section
50 collar
51 interior thread
52 exterior thread
53 solenoid
54 mass
55 absorber
56 damper
57 elastomer element
58 core diameter
59 exterior diameter
60 seal
61 first helix
62 second helix
63 third helix
64 fourth helix
65 fifth helix
66 sixth helix
67 particle chains
68 curve single-start thread
69 curve double-start thread
70 curve for different spindle core diameters
71 curve for different spindle core diameters and double-start thread
B magnetic field
Sn gap new
Sv gap worn
S distance
U revolution

What is claimed is:

1. A magnetorheological actuator comprising:
a chamber containing a magnetorheological fluid; and
a control element disposed in the chamber, the control element configured for applying an actuating force of the actuator, the control element including a threaded spindle driven to rotate about a longitudinal axis and having a spindle core and a thread located thereon, the thread surrounded by the magnetorheological fluid.

2. The magnetorheological actuator as recited in claim 1 wherein the threaded spindle is received in the chamber so as to be displaceable in an axial direction or a particle cushion for supporting the threaded spindle is positively formable during operation.

3. The magnetorheological actuator as recited in claim 1 wherein the thread contacts an interior wall of the chamber in a sealing way.

4. The magnetorheological actuator as recited in claim 1 wherein a clearance is formed between thread tips of the thread and an interior wall of the chamber.

5. The magnetorheological actuator as recited in claim 4 wherein the clearance is dimensioned in such a way that carrier liquid of the magnetorheological fluid is capable of passing through the clearance.

6. The magnetorheological actuator as recited in claim 1 wherein the threaded spindle is provided with axial through-holes providing a flow connection between adjacent thread sections.

7. The magnetorheological actuator as recited in claim 1 wherein the thread is a multi-start thread.

8. The magnetorheological actuator as recited in claim 1 wherein the thread has a varying gradient.

9. The magnetorheological actuator as recited in claim 1 wherein an interior diameter of the thread is different from a diameter of the spindle core in a region outside the thread.

10. A clutch comprising the magnetorheological actuator as recited in claim 1.

11. The magnetorheological actuator as recited in claim 1 wherein at least one end of the spindle protrudes outside of the chamber.

12. The magnetorheological actuator as recited in claim 1 wherein the spindle core includes a first cylindrical end portion and a second cylindrical end portion, the thread extending radially outward past outer circumferential surfaces of the first cylindrical end portion and the second cylindrical end portion.

13. The magnetorheological actuator as recited in claim 1 wherein the thread is axially movable within the chamber such that an amount of magnetorheological fluid behind a last winding of the thread is variable.

14. The magnetorheological actuator as recited in claim 13 further comprising a housing having an inner surface defining the chamber, the spindle core including an outer surface that is spaced radially from the inner surface of the housing, the magnetorheological fluid being between the outer surface of the spindle core and the inner surface of the housing.

15. The magnetorheological actuator as recited in claim 14, wherein the thread extends radially outward from the outer surface of the spindle core toward the inner surface of the housing.

16. The magnetorheological actuator as recited in claim 13, wherein thread is axially movable within the chamber such that an amount of magnetorheological fluid behind a first winding of the thread is variable.

* * * * *